US012696004B2

(12) United States Patent
Palmigiani

(10) Patent No.: US 12,696,004 B2
(45) Date of Patent: Jul. 28, 2026

(54) FREQUENCY DETECTION PIXEL

(71) Applicant: Commissariat à l'Énergie Atomique et aux Énergies Alternatives, Paris (FR)

(72) Inventor: Gaelle Palmigiani, Grenoble (FR)

(73) Assignee: Commissariat à l'Énergie Atomique et aux Énergies Alternatives, Paris (FR)

( * ) Notice: Subject to any disclaimer, the term of this patent is extended or adjusted under 35 U.S.C. 154(b) by 25 days.

(21) Appl. No.: 18/807,227

(22) Filed: Aug. 16, 2024

(65) Prior Publication Data

US 2025/0063265 A1 Feb. 20, 2025

(30) Foreign Application Priority Data

Aug. 18, 2023 (FR) ...................................... 2308798

(51) Int. Cl.
*H04N 25/60* (2023.01)
*H04N 25/77* (2023.01)

(52) U.S. Cl.
CPC ............. *H04N 25/60* (2023.01); *H04N 25/77* (2023.01)

(58) Field of Classification Search
CPC ........ H04N 25/60; H04N 25/77; H04N 25/46; H10F 39/199; H10F 39/8033; H10F 39/813; H10F 39/8027; G01J 9/00

USPC .......................................................... 348/304
See application file for complete search history.

(56) References Cited

U.S. PATENT DOCUMENTS

| | | | |
|---|---|---|---|
| 6,515,740 B2 | 2/2003 | Bamji et al. | |
| 11,994,424 B2 * | 5/2024 | Malinge ..................... | G01J 1/46 |
| 2011/0181749 A1 | 7/2011 | Yamada | |
| 2017/0030769 A1 * | 2/2017 | Clemens .................... | G01J 1/46 |
| 2023/0247331 A1 * | 8/2023 | Yoneda ................ | H04N 25/707 |
| | | | 348/300 |
| 2024/0334087 A1 * | 10/2024 | Bianchini ............ | H04N 25/773 |

OTHER PUBLICATIONS

Preliminary Search Report for French Application No. 2308798, dated Mar. 13, 2024.

* cited by examiner

*Primary Examiner* — Usman A Khan
(74) *Attorney, Agent, or Firm* — Wolf, Greenfield & Sacks, P.C.

(57) ABSTRACT

A pixel including a first node, a second node configured to receive a first DC potential, and a plurality of acquisition channels each including: a photodiode adapted to detect radiation in a first wavelength range; a capacitive element coupling the photodiode to the first node; and a resistive element coupling a first terminal of the photodiode to the second node.

13 Claims, 4 Drawing Sheets

FREQUENCY DETECTION PIXEL

CROSS REFERENCE TO RELATED APPLICATIONS

This application claims priority to French application number 2308798, filed Aug. 18, 2023. The contents of which is incorporated by reference in its entirety.

TECHNICAL FIELD

The present description relates generally to electronic circuits, for example integrated electronic circuits, and more particularly to a pixel for detecting a frequency of a light signal received by this pixel.

BACKGROUND ART

Many known integrated circuits comprise at least one known pixel used to detect, or measure, a frequency of a light signal received by this pixel. Such circuits or pixels are used, for example, with frequency detection methods such as Frequency Modulated Continuous Wave (FMCW).

However, these known pixels and circuits for detecting the frequency of a received light signal have their drawbacks.

For example, the photoconversion that takes place in these pixels to obtain a photo-current at the frequency of the signal received is interfered with by photon noise, and the useful part, or useful signal, of the photo-current obtained is drowned in the noisy part of this photo-current.

For example, when these frequency detection pixels are used to detect the frequency of infrared signals and are, further, arranged in an array of pixels used to detect visible light, these frequency detection pixels take the place of pixels for visible light detection. This has an adverse impact on the quality of the two-dimensional image obtained with the visible light detection pixels.

SUMMARY OF INVENTION

There is a need to overcome some or all of the drawbacks of known circuits and/or pixels for detecting the frequency of a light signal, for example on the basis of an FMCW-type method.

One embodiment overcomes some or all of the drawbacks of known circuits and/or pixels for detecting the frequency of a light signal, for example on the basis of an FMCW-type method.

One embodiment provides a pixel comprising a first node, a second node configured to receive a first DC potential, and a plurality of acquisition channels each comprising:

a photodiode adapted to detect radiation in a first range of wavelengths;

a capacitive element coupling the photodiode to the first node; and a resistive element coupling a first terminal of the photodiode to the second node wherein the pixel further comprises:

a switch coupling the first node to a node configured to receive a second DC potential; and a control circuit configured to control the switch to the off state during an acquisition phase so that the first node is floating.

According to one embodiment, in each channel, the capacitive element has one electrode connected to the first node, and another electrode connected to the photodiode, for example to the first terminal of the photodiode.

According to one embodiment, in each channel, the photodiode is a non-pinned photodiode.

According to one embodiment, the pixel comprises a sense circuit having an input coupled, preferably connected, to the first node.

According to one embodiment, the sense circuit is configured to provide a binary signal in a first state if a voltage on the first node is above a threshold, and in a second state if the voltage on the first node is below the threshold, the threshold being, for example, determined at least in part by the first potential.

According to one embodiment, the pixel comprises a sense circuit having an input coupled, for example connected, to the first terminal of the photodiode of one of the channels of the pixel.

According to one embodiment, the sense circuit is configured to provide a binary signal in a first state if a voltage on the first node is above a threshold, and in a second state if the voltage on the first node is below the threshold, the threshold being, for example, determined at least in part by the first potential.

According to one embodiment, the pixel comprises a sense circuit having an input connected to the second node, the sense circuit being configured to supply the first potential to the second node.

According to one embodiment, the sense circuit is further configured to convert a current on its input into a voltage, and to provide a binary signal in a first state if said voltage is above a threshold, and in a second state if said voltage is below the threshold, the threshold being, for example, determined at least in part by the first potential.

According to one embodiment:

the pixel comprises a first semiconductor region doped with a first type of conductivity, adapted to detect radiation in a second range of wavelengths, for example visible, and extending from a first face, the first face being intended to receive radiation in the first and second ranges of wavelengths;

the photodiode of each channel comprises:

a second semiconductor region doped with the first conductivity type, corresponding to the first terminal of the photodiode, and extending from a second face parallel to the first face, and a third semiconductor region doped with the second conductivity type, and sandwiched between the first region and the second region;

the pixel comprises a vertical transfer gate extending from the second face to the first region, the transfer gate electrically isolating the photodiodes of the channels from each other and being in contact with each second region.

According to one embodiment, the vertical transfer gate comprises a conductive core and an insulating sheath, with the conductive core corresponding to the first node of the pixel.

According to one embodiment, the pixel further comprises:

an additional sense circuit and a circuit configured to:

selectively couple and decouple the first electrode of the photodiode of each channel from the second node; and selectively couple and decouple the first electrode of the photodiode of each channel from the additional sense circuit.

One embodiment provides a sensor comprising a plurality of pixels as described above.

BRIEF DESCRIPTION OF DRAWINGS

The foregoing features and advantages, as well as others, will be described in detail in the following description of specific embodiments given by way of illustration and not limitation with reference to the accompanying drawings, in which.

DESCRIPTION OF EMBODIMENTS

Like features have been designated by like references in the various Figures. In particular, the structural and/or functional features that are common among the various embodiments may have the same references and may dispose identical structural, dimensional and material properties.

For the sake of clarity, only the operations and elements that are useful for an understanding of the embodiments described herein have been illustrated and described in detail. In particular, the various known circuits, systems, and applications in which one or more frequency detection pixels may be provided have not been described in detail, as the embodiments and variants described herein are compatible with these known circuits, systems, and applications.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Figures 1, 2:
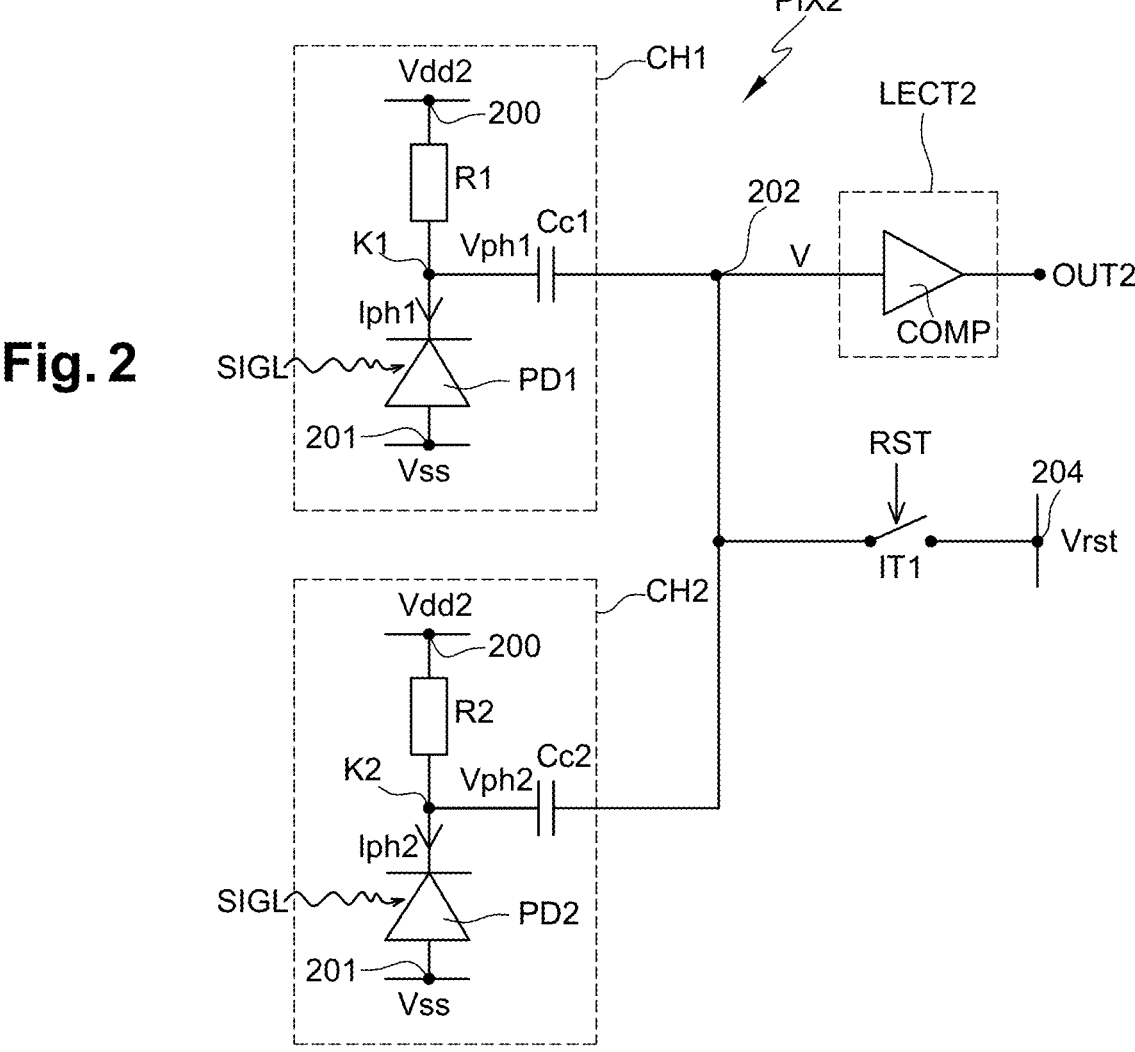
FIG. 1 illustrates an example pixel for detecting the frequency of a light signal.
FIG. 2 illustrates an example embodiment of a pixel for detecting the frequency of a light signal.

FIG. 1 illustrates an example pixel PIX1 for detecting the frequency of a light signal SIGL.

The pixel PIX1 comprises a photodiode PD. The photodiode PD is a non-pinned photodiode, or, in other words, is not a pinned photodiode.

The photodiode PD has its cathode K coupled to a node 100 configured to receive a bias potential Vdd. More particularly, the pixel PIX1 comprises a resistive element R coupling the cathode K of the photodiode PD to the node 100. The anode of the photodiode PD is coupled, for example connected, to a node 102 configured to receive a reference potential Vss. The potential Vdd is, for example, positive. The potential Vdd is greater than the potential Vss.

The pixel PIX1 further comprises a sense circuit LECT1. The circuit LECT1 has an input coupled, preferably connected, to the cathode K of the photodiode PD.

In operation, the photodiode PD of pixel PIX1 receives the light signal SIGL, and converts it into a photocurrent Iph. This current Iph is converted, by the resistive element R, into a voltage Vph available on the cathode K of photodiode PD. The circuit LECT1 receives the voltage Vph and provides a binary output signal OUT1. Circuit LECT1 is configured so that signal OUT1 is in a first binary state when voltage Vph is above a threshold, for example equal to the DC voltage present on cathode K of photodiode PD, and in a second binary state when voltage Vph is below this threshold.

As the photo-current evolves at the same frequency as the signal SIGL, the voltage Vph comprises an AC component at the frequency of the signal, and the OUT1 signal is then a periodic binary signal at the frequency of the signal SIGL.

However, the above operation does not take into account the photon noise in the photodiode PD. This photon noise results in a noise component in the photocurrent Iph, which in turn results in a noise component in the voltage Vph. This noise in the voltage Vph results in unwanted switching of the signal OUT1, which then no longer oscillates at the frequency that the pixel PIX1 was intended to detect or measure.

A pixel is proposed which comprises several acquisition channels, each comprising a standard (or non-pinned) photodiode. The photodiodes of the pixel are connected to each other by capacitive coupling elements. Each photodiode of the pixel supplies a signal with a useful component at the frequency of the light signal received by the pixel. As the photon noise is different in each of the photodiodes of the pixel, the coupling capacitances allow this photon noise to be averaged, with the result that the noise component in the signal supplied by the photodiodes of the pixel is reduced relative to the useful component of this signal.

FIG. 2 illustrates an example embodiment of a pixel PIX2 for detecting the frequency of a light signal SIGL.

The pixel PIX2 comprises a node 200 configured to receive a bias potential Vdd2. In the example shown in FIG. 2, potential Vdd2 is received by node 200. As in pixel PIX1, potential Vdd2 is a DC potential.

The pixel PIX2 further comprises a node 202.

Pixel PIX2 comprises N acquisition channels CHi, with N an integer greater than or equal to 2, and i an integer index ranging from 1 to N. In the example shown in FIG. 2, pixel PIX2 comprises N=2 acquisition channels CHi and CH2.

Each channel CHi comprises a photodiode PDi. Thus, in the example shown in FIG. 2, channel CHi comprises a photodiode PD1 and channel CH2 comprises a photodiode PD2.

Each photodiode PDi is a non-pinned photodiode.

Each channel CHi further comprises a resistive element, such as a resistor, Ri. Thus, in the example shown in FIG. 2, channel CHi comprises an element R1 and channel CH2 comprises an element R2.

In each channel CHi, the cathode Ki (K1 and K2 in FIG. 2) of the photodiode PDi of that channel CHi is coupled to node 200 by the resistive element Ri of that channel CHi. In the example shown in FIG. 2, in each channel CHi, element Ri has one terminal connected to cathode Ki of photodiode PDi and another terminal connected to node 200.

In each channel CHi, the anode of photodiode PDi is coupled, for example connected, to a node 201 configured to receive a reference potential Vss. The potential Vss is a DC potential. The potential Vdd2 is, for example, positive. Potential Vdd2 is greater than potential Vss.

Each channel CHi also comprises a capacitive element, such as a capacitor, Cci. Thus, in the example shown in FIG. 2, channel CHi comprises an element Cc1 and channel CH2 comprises an element Cc2.

In each channel CHi, capacitive element Cci couples cathode Ki of photodiode PDi to node 202 of pixel PIX2. For example, in each channel CHi, element Cci has one terminal (or electrode) connected to cathode Ki of photodiode PDi in channel CHi, and another terminal (or electrode) connected to node 202. Preferably, the elements Cci all have substantially equal capacitance values, for example equal.

In the pixel PIX2, when the signal SIGL is received by the photodiodes PDi of the pixel PIX2, each photodiode PDi supplies a photo-current Iph1 (Iph1 and Iph2 in FIG. 2) converted into a voltage Vphi (Vph1 and Vph2 in FIG. 2) on the Ki cathode of the photodiode PDi. In each channel PDi, the photo-current Iph1 and the corresponding voltage Vphi each comprise a similar or identical useful component in all channels CHi, and a different noise component in each channel CHi. This is because the photodiodes PDi are subjected to the same incident signal SIGL, but the photon noise is different from one photodiode to another.

Further, when node 202 is left floating, the capacitive elements Cci coupling the photodiodes PDi together force, by capacitive coupling, a common inertia on all voltages Vphi. As a result, similar components in all channels CHi, i.e. the useful signal, are preserved, while noise components are reduced. In other words, the capacitive elements Cci implement an averaging function that tends to reduce the noise components of the channels CHi and bring their voltages Vphi down to their mean value, which corresponds to the useful signal at the frequency of signal SIGL.

According to one embodiment, the pixel PIX2 comprises a circuit for resetting node 202 to a reset potential Vrst. The reset circuit is configured to set node 202 to the potential Vrst before an acquisition phase, or frequency detection phase, and then to leave node 202 floating during this acquisition phase. The potential Vrst is chosen, for example, so that, when node 202 is floating, the voltage V on node 202 can follow the variations in the useful components of the voltages Vphi without clipping. For example, in FIG. 2, the potential Vrst can be chosen to be substantially equal, for example equal, to the average of the potentials Vdd2 and Vss.

The reset circuit comprises a switch IT1, for example a MOS (Metal Oxide Semiconductor) transistor. Switch IT1 couples node 202 to a node 204 configured to receive the potential Vrst, at least during a reset phase prior to a frequency detection phase. By way of example, switch IT1 comprises a conduction terminal coupled, preferably connected, to node 202, and another conduction terminal coupled, preferably connected, to node 204. The switch IT1 is controlled by a signal RST. The signal RST is provided, for example, by a control circuit of the pixel PIX2, this control circuit being, for example, part of the pixel PIX2 or of a more complex circuit or system comprising the pixel PIX2.

The pixel PIX2 comprises a sense circuit LECT2. The circuit LECT2 is configured to provide a binary signal OUT2 at the frequency of signal SIGL from a signal (voltage or current) present at a node of the pixel PIX2. More particularly, the circuit LECT2 has an input coupled or connected to a node of the pixel PIX2 on which a signal at the frequency of the signal SIGL is available, and an output configured to deliver the signal OUT2.

For example, signal OUT2 is a binary signal in a first binary state when the input signal to circuit LECT2 is above a threshold, and in a second binary state when the input signal to circuit LECT2 is below this threshold. By way of example, the value of this threshold is determined by a DC component of the signal at the input of circuit LECT2, so that signal OUT2 is at the frequency of signal SIGL.

In the embodiment shown in FIG. 2, circuit LECT2 has its input coupled, preferably connected, to node 202. By way of example, in the example shown in FIG. 2, the circuit LECT2 comprises a comparator COMP having an input connected to the input of the circuit LECT2 and an output connected to the output of the circuit LECT2, the output of the comparator COMP delivering the signal OUT2.

Although in the example shown in FIG. 2, the number N of channels CHi is equal to 2, those skilled in the art will be able to provide pixels PIX2 with a number N of channels CHi strictly greater than 2.

Figure 3:
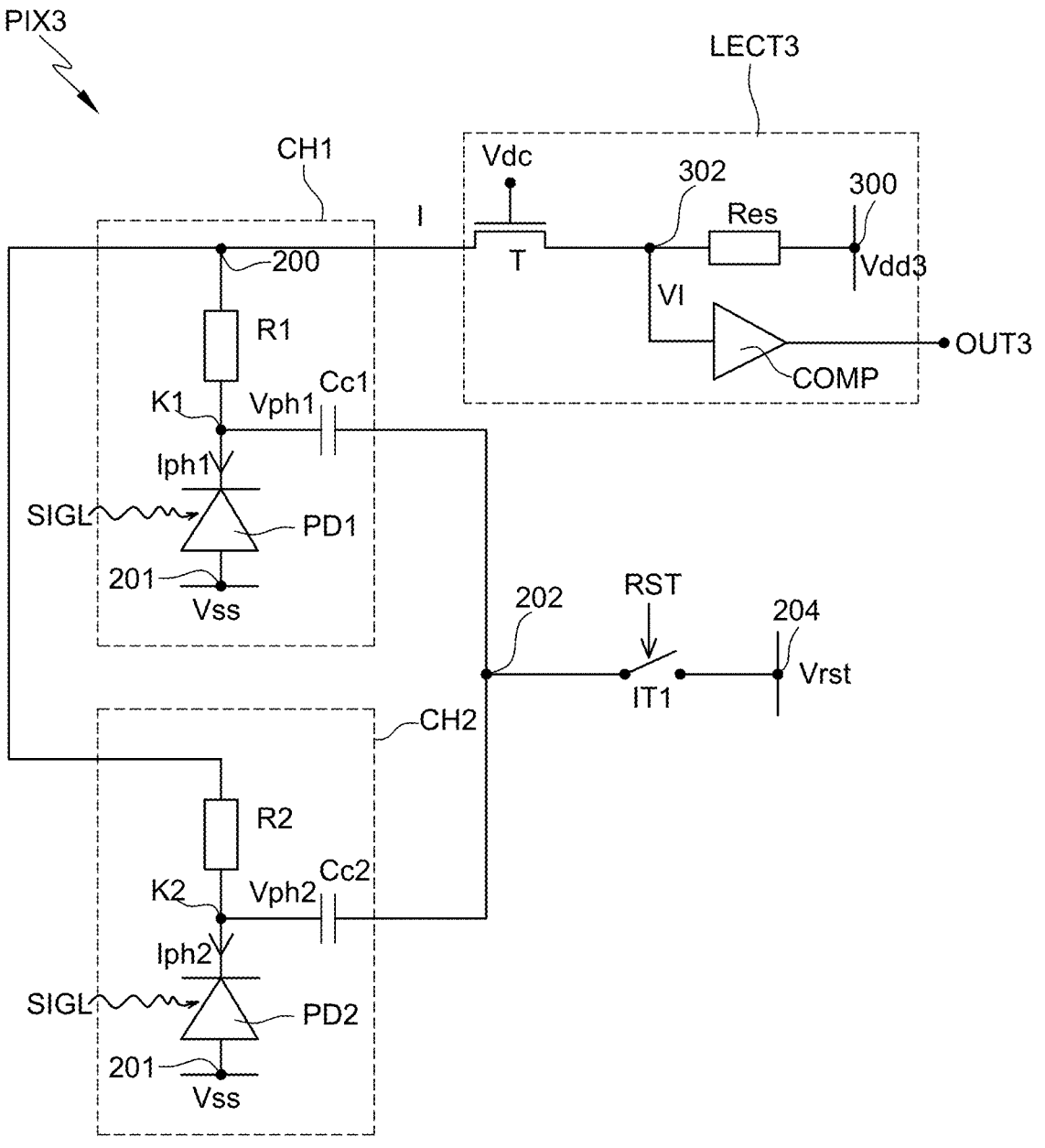
FIG. 3 illustrates an example alternative implementation of a pixel for detecting the frequency of a light signal.

FIG. 3 illustrates an example alternative implementation of a pixel PIX3 for detecting the frequency of a light signal.

The pixel PIX3 has many features in common with the pixel PIX2, and only the differences between these two pixels are highlighted here.

In the example shown in FIG. 3, the pixel PIX3 comprises N=2 channels CHi.

The pixel PIX3 comprises a sense circuit LECT3 in place of the circuit LECT2 of the pixel PIX2. Like the circuit LECT2, the circuit LECT3 is configured to deliver a binary signal OUT3 at the frequency of the signal SIGL from a signal (voltage or current) present at a node of the pixel PIX3. More particularly, the circuit LECT3 has an input coupled or connected to a node of the pixel PIX3 on which a signal at the frequency of the signal SIGL is available, and an output configured to deliver the signal OUT3.

For example, signal OUT3 is a binary signal in a first binary state when the signal at the input of circuit LECT3 is above a threshold, and in a second binary state when the signal at the input of circuit LECT3 is below this threshold. By way of example, the value of this threshold is determined by a DC component of the signal at the input of circuit LECT3, so that signal OUT3 is at the frequency of signal SIGL.

In contrast to the embodiment shown in FIG. 2, where the circuit LECT2 of pixel PIX2 has its input coupled, preferably connected, to node 202, in the alternative implementation shown in FIG. 3 the circuit LECT3 of pixel PIX3 has its input coupled, preferably connected, to node 200.

Thus, in the alternative implementation shown in FIG. 3, as compared to circuit LECT2, circuit LECT3 is further configured to supply a DC bias potential to node 200, or, in other words, to force the DC potential of node 200.

Furthermore, in the alternative implementation shown in FIG. 3, the input of circuit LECT3 receives the sum of the photo-currents Iph1 supplied to node 200 by the photodiodes PDi of the channels CHi of pixel PIX3. Circuit LECT3 then compares the total current I it receives with a threshold to determine the state of signal OUT3. More specifically, signal OUT3 is in a first binary state if current I is above the threshold, and in a second binary state if current I is below the threshold. By way of example, the current threshold value is determined by a DC component of current I, so that signal OUT3 is at the frequency of signal SIGL.

More specifically, in the example shown in FIG. 3, the circuit LECT3 performs a conversion of the current I received at its input into a voltage VI, which is then compared with a voltage threshold to determine the state of signal OUT3. By way of example, the value of this voltage threshold is determined by a DC component of voltage VI, so that signal OUT3 is at the frequency of signal SIGL.

According to one embodiment, as illustrated in FIG. 3, the circuit LECT3 comprises a resistive element, for example a resistor, Res and a MOS transistor T connected in series between the input of the circuit LECT3 and a node 300 configured to receive a bias potential Vdd3. Transistor T and resistive element Res are connected to each other at a node 302. Transistor T is connected between the input of circuit LECT3 and node 302, with resistive element Res connected between node 302 and node 300. For example, transistor T has one conduction terminal connected to node 302 and another conduction terminal connected to the input of circuit LECT3. For example, the resistive element Res has one terminal connected to node 302 and another terminal connected to node 300.

Transistor T is controlled by a DC potential Vdc applied to its gate, so as to force the DC bias potential on node 200, or, in other words, so that node 200 receives this DC bias potential. In other words, transistor T is cascode-mounted and receives the cascode voltage Vdc on its gate.

The resistive element Res is configured to convert the current I received by the input of circuit LECT3 into a voltage VI, in this example available on node 302.

In this embodiment, the circuit LECT3 further comprises a circuit COMP, for example a comparator, configured to compare the voltage VI with the threshold and to provide the signal OUT3 on the basis of the result of this comparison. For example, the circuit COMP has an input coupled, preferably connected, to node 302, and an output coupled, preferably connected, to the output of the circuit LECT3 on which signal OUT3 is available.

Figure 4:
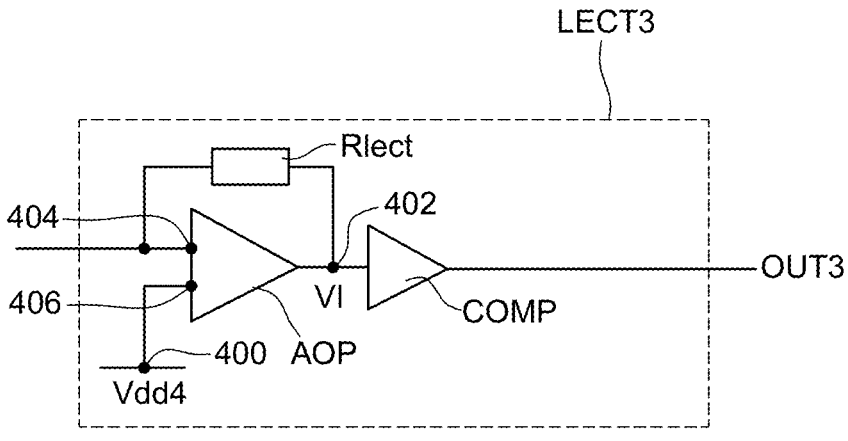
FIG. 4 illustrates an example alternative implementation of a part of the pixel shown in FIG. 3.

FIG. 4 illustrates an example of an alternative implementation of part of the pixel PIX3 shown in FIG. 3, and, more specifically, of the circuit LECT3.

In this alternative, the circuit LECT3 comprises an operational amplifier AOP. The amplifier AOP has one input 404 coupled, preferably connected, to the input of the circuit LECT3, and another input 406 coupled, preferably connected, to a node 400 configured to receive a bias potential Vdd4. The output of the amplifier AOP is connected to a node 402 of the circuit LECT3. A resistor Rlect is connected between the input 404 of the amplifier AOP and node 402 (output of the amplifier AOP). The amplifier AOP is summator-mounted with the resistors Ri of the channels CHi of pixel PIX3 (see FIG. 3). The amplifier AOP also enables a bias potential to be forced on node 200, to which the input of the circuit LECT3 is coupled, preferably connected (see FIG. 3). The amplifier AOP allows the sum of the currents Iph1 in the channels CHi of pixel PIX3, i.e. the current I received by the input of circuit LECT3, to be converted into a voltage VI available on node 402.

In this alternative implementation, as in FIG. 3, the circuit LECT3 further comprises a circuit COMP, for example a comparator, configured to compare the voltage VI with the threshold and to provide the signal OUT3 on the basis of the result of this comparison. For example, the circuit COMP has an input coupled, preferably connected, to node 402, and an output coupled, preferably connected, to the output of circuit LECT3 on which signal OUT3 is available.

Embodiments and alternatives of a pixel with several channels CHi, in each of which is provided a photodiode PDi and a capacitive element Cci coupling an electrode of the photodiode to a node 202 of the pixel, have been described. From the description of these embodiments and alternatives, those skilled in the art will be able to implement this pixel. In particular, those skilled in the art will be able to provide other implementations of the circuits LECT2 and LECT3 than those given by way of example.

An implementation of the pixel PIX2 that those skilled in the art will know how to adapt to the pixel PIX3 will now be described. This implementation is particularly suitable and advantageous when the pixel PIX2 is intended to be implemented in a pixel array of a sensor configured to detect light signal frequencies, for example infrared, and to acquire a two-dimensional image of a scene. An example of such an implementation will now be described in relation to FIGS. 5, 6, and 7.

Figure 5:
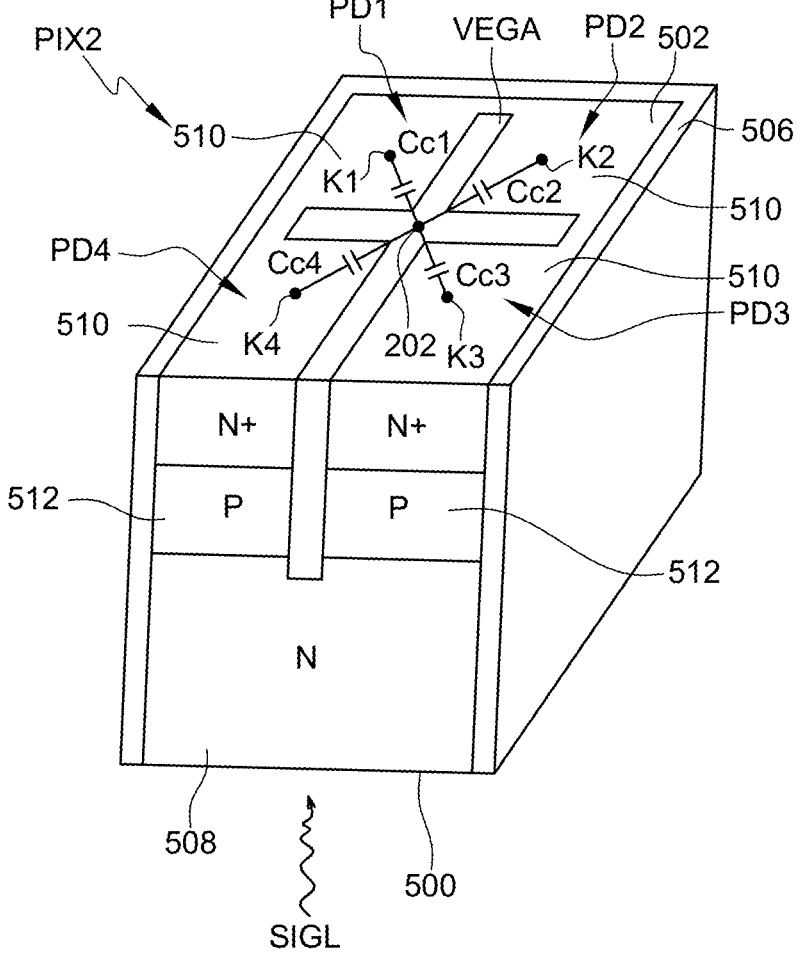
FIG. 5 illustrates a three-dimensional partial sectional view of an example embodiment of a pixel for detecting the frequency of a light signal and for acquiring another light signal.

FIG. 5 illustrates an example three-dimensional partial sectional view pixel PIX2 for detecting the frequency of a light signal, e.g. infrared, and for acquiring another light signal, e.g. visible. FIG. 5 is taken from a sectional plane AA shown in FIG. 6, which shows a partial top view of the pixel PIX2.

Figure 6:
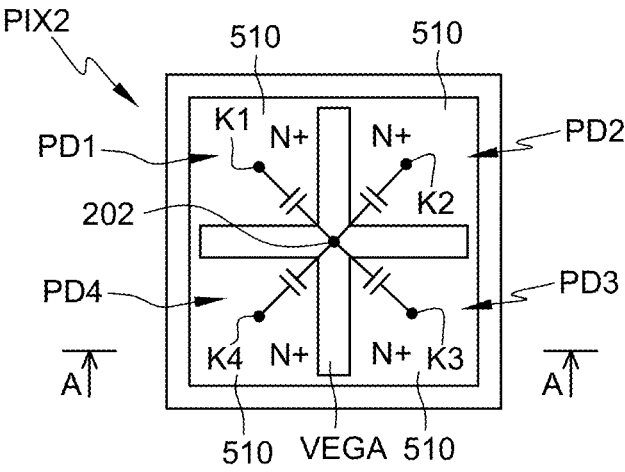
FIG. 6 illustrates a partial top view of the pixel shown in FIG. 5.

In these FIGS. 5 and 6, the circuit LECT2, the resistors Ri and the switch IT1 have not been shown to avoid overloading the drawings. In these figures, the number N of channels CHi of pixel PIX2 is equal to 4, but those skilled in the art will know how to adapt the description of FIGS. 5 and 6 to pixels comprising any number N of channels greater than or equal to 2.

The pixel PIX2 comprises a portion of a silicon substrate extending in thickness (or height) between a face 500 (bottom face in FIG. 5) and a face 502 (top face in FIG. 5), face 502 being the face illustrated in FIG. 6. Face 500 is the face of the pixel PIX2 intended to receive light, i.e. both the light signal, for example infra-red, the frequency of which the pixel PIX2 will detect, and the light signal, for example visible, which the pixel PIX2 will integrate, for example to obtain a corresponding image pixel of a two-dimensional image of a scene.

The silicon substrate portion of the pixel PIX2 is laterally delimited by an isolation structure 506 extending through the entire thickness of the substrate, i.e. an isolation structure 506 extending from surface 502 to surface 500. Preferably, structure 506 completely surrounds the semiconductor substrate portion of the pixel PIX2.

Structure 506 is, for example, a Capacitive Deep Trench Insulation (CDTI). In this case, structure 506 comprises a core of conductive material (not shown in FIGS. 5 and 6) covered by an insulating sheath (not shown in FIGS. 5 and 6) insulating the conductive core from the silicon of the substrate portion of the pixel PIX2.

As an alternative example, structure 506 is a Deep Trench Insulation (DTI). Preferably, in this alternative example, a layer (not shown in FIGS. 5 and 6) doped with a first type of conductivity, type P in the example shown in FIGS. 5 and 6, completely covers the flanks of structure 506.

The pixel PIX2 comprises a semiconductor region 508 doped with a second conductivity type, type N in the example shown in FIGS. 5 and 6. Region 508 is, for example, a portion of a layer extending in thickness from face 500. In other words, region 508 extends from face 500. Region 508 is bounded laterally by structure 506, with which region 508 is in contact. Region 508 has, for example, a substantially constant thickness, its thickness being measured in a direction orthogonal to faces 500 and 502 of pixel PIX2. Region 508 is configured to implement a pinned photodiode.

In this embodiment, the photodiode PDi (PD1, PD2, PD3, and PD4 in FIGS. 5 and 6) of each channels CHi (not referenced in FIGS. 5 and 6) comprises a semiconductor region 510 (FIG. 5) doped with the second conductivity type, type N in this example.

In each photodiode PDi, the region 510 is preferably more heavily doped than the region 508, or, in other words, the doping level of each region 510 is greater than the doping level of the region 508. In this example, the regions 510 are therefore more heavily N-type (N+) doped than the region 508.

For each photodiode PDi, region 510 corresponds, in this example, to the cathode Ki (K1, K2, K3, and K4 in FIGS. 5 and 6) of the photodiode PDi.

Each region 510 extends from the face 502 of the pixel PIX2. Preferably, the regions 510 all have the same thickness. For example, each region 510 corresponds to a portion of a doped layer of the second conductivity type having a face merging with face 502.

In this embodiment, the photodiode PDi of each channels CHi also comprises a doped semiconductor region 512 of the first conductivity type, type P in this example. In FIG. 5, only the regions 512 of photodiodes PD3 and PD4 are visible.

For each photodiode PDi, region 512 corresponds, in this example, to the anode of the photodiode PDi. Thus, although not shown in FIGS. 5 and 6, pixel PIX2 comprises means configured to apply potential Vss to regions 512.

By way of example, when structure 506 is of the DTI type bordered by a doped layer of the same type as regions 512, pixel PIX2 comprises a doped region of the same type as regions 512 which is flush with surface 502 and in contact with this doped layer, so that by applying potential Vss to this region, potential Vss is also applied to regions 512.

As an alternative example, when structure 506 is of the CDTI type, pixel PIX2 comprises a circuit configured to apply a bias potential to the conductive core of structure 506 so that a doped layer of the same conductivity type as regions 512 forms along the walls of structure 506, and the pixel PIX2 further comprises a doped region of the same type as the regions 512 which is flush with the surface 502 and in contact with this doped layer, so that by applying the potential Vss to this region, the potential Vss is also applied to the regions 512.

In each photodiode PDi, region 512 is sandwiched between region 508 and region 510 of the photodiode PDi. In other words, in each photodiode PDi, region 512 extends in thickness from region 508 to region 510 of that photodiode PDi. In yet other words, in each photodiode PDi, region 512 has one face in contact with one face of region 508, and an opposite face in contact with region 510 of that photodiode PDi.

Preferably, all regions 512 have the same thickness. For example, each region 512 corresponds to a portion of a doped layer of the first conductivity type resting on and in contact with the region 508.

The pixel PIX2 further comprises a vertical transfer gate VEGA. The gate VEGA extends vertically from face 502 of pixel PIX2 to region 508, and preferably penetrates into region 508 over only part of the thickness of region 508. The gate VEGA electrically isolates the photodiodes PDi from each other. The gate VEGA is in contact with each of the regions 512. The gate VEGA comprises a conductive core (not shown in FIGS. 5 and 6) covered by an insulating sheath (not shown in FIGS. 5 and 6), the insulating sheath electrically insulating the conductive core from the silicon bordering the gate VEGA.

The conductive core of the gate VEGA corresponds, in this embodiment, to node 202 of pixel PIX2. Thus, advantageously, in this embodiment, the capacitive elements Cci (Cc1, Cc2, Cc3, and Cc4 in FIGS. 5 and 6) are implemented by the gate VEGA, and, more particularly, by the conductive core 202 of the gate VEGA which corresponds to a first electrode of the capacitive element Cci, the insulating sheath of the gate VEGA, which corresponds to the insulating layer of the capacitive element, and by the region 510 of the corresponding photodiode PDi, which corresponds to the second electrode of the capacitive element Cci. The capacitive elements Cci are shown schematically in FIGS. 5 and 6.

Thus, in the pixel PIX2 shown in FIGS. 5 and 6, when:

light, for example visible light, is received by the face 500 of the pixel PIX2, the potential of the conductive core of the gate VEGA has been initialized to a value such that the gate VEGA is blocked, i.e. photogenerated charges in the pinned photodiode 508 cannot be transferred to the regions 510, the conductive core of the gate VEGA is left floating, and the face 500 also receives the light signal SIGL, e.g. an infrared signal, so the pixel PIX2 integrates the light, e.g. visible, received in region 508, and, at the same time, the light signal SIGL, e.g. infrared, is converted within each photodiode PDi into a corresponding photo-current Iph1 (not referenced in FIGS. 5 and 6). Due to the presence of capacitive elements Cci coupling each photodiode PDi to the floating node 202, the pixel PIX2 implements the photon noise reduction function in the photodiodes PDi. The sense circuit LECT2 of pixel PIX2 (not shown in FIGS. 5 and 6) can then read out a signal at the frequency of the signal SIGL on node 202.

After a phase of detection of the frequency of the signal SIGL during which light, e.g. visible light, has been converted into photogenerated charges in the pinned photodiode 508, the charges accumulated in region 508 can be read by applying a potential to the gate VEGA, turning it on. The accumulated charges are then transferred to regions 510 where they can be read by an additional dedicated sense circuit.

During this phase of reading photogenerated charges, although not illustrated in FIGS. 5 and 6, regions 510 are electrically isolated from node 200 (FIG. 2) by a circuit configured for this purpose, whereas they are coupled to this node 200 by this same circuit during a phase of detecting the frequency of the light signal SIGL.

Further, this circuit configured so that to each of the regions 510 is selectively coupled to and decoupled from the node 200 is also configured, during the phase of reading the charges accumulated in the region 508, to couple each of the regions 510 to a sense node of the pixel PIX2, whereas this circuit is configured not to couple these regions 510 to the sense node during a frequency detection phase. An additional sense circuit configured to read charges transferred to the sense node is connected to this sense node.

In other words, although not shown in FIGS. 5 and 6, the pixel PIX2 comprises a circuit configured so that the regions 510 of the photodiodes PDi are selectively coupled to and decoupled from the node 200, for example the corresponding resistor Ri which is connected to the node 200, and so that the regions 510 are selectively coupled to and decoupled from the detection node.

An example embodiment of the pixel PIX2 in which the sense circuits and the circuit configured so that the regions 510 of the photodiodes PDi are selectively coupled to and decoupled from the node 200, and so that the regions 510 are selectively coupled to and decoupled from the detection node, will now be described in detail in relation to FIG. 7.

Figure 7:
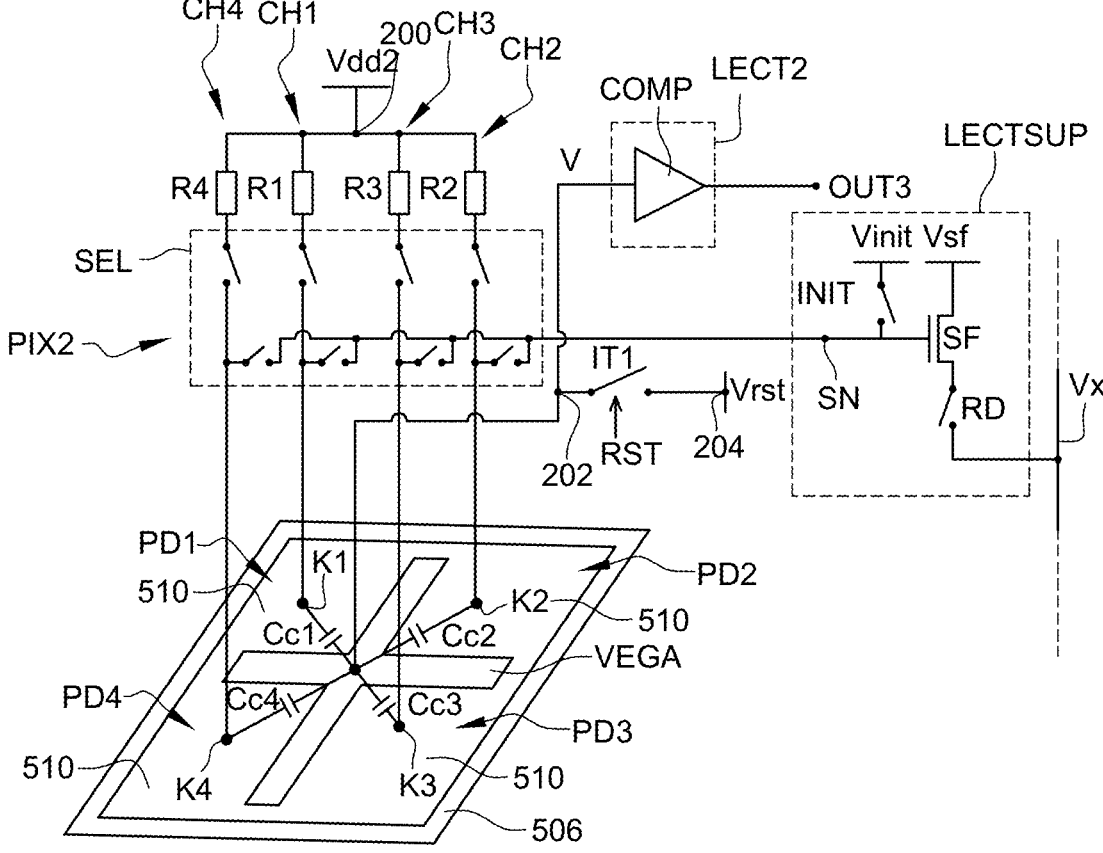
FIG. 7 illustrates, schematically and at least partly in circuit form, the pixel shown in FIGS. 5 and 6.

FIG. 7 illustrates, schematically and at least partly in circuit form, the pixel PIX2 shown in FIGS. 5 and 6.

In FIG. 7, the conductive core of the gate VEGA corresponding to node 202 is coupled to node 204 by switch IT1.

The pixel PIX2 comprises the circuit LECT2 with its input connected to node 202 and its output providing the signal OUT2.

The pixel PIX2 comprises a detection node SN, and an additional sense circuit LECTSUP connected to the node SN. By way of example, the circuit LECTSUP comprises an initialization switch INIT of the node SN coupling the node SN to an reset potential Vinit, a MOS transistor SF having its gate connected to the node SN and its drain connected to a bias potential Vsf, and a read switch RD coupling the source of the transistor SF to a read conductive line Vx. The operation of such a sense circuit, for example called circuit 3T, is well known to those skilled in the art. Further, those skilled in the art will be able to provide other examples of implementations of the circuit LECTSUP.

The pixel PIX2 further comprises a circuit SEL configured so that the region 510 of each of the photodiodes PDi are selectively coupled to and decoupled from the node 200, and so that these regions 510 are selectively coupled to and decoupled from the node SN. More particularly, the circuit SEL is configured, during a phase of transferring photogenerated charges from the region 508 to the regions 510, and during a phase of reading these transferred charges, so that each region 510 is electrically coupled to the node SN by the circuit SEL, and the circuit SEL electrically decouples each region 510 from the node 200, and, during a phase of detecting the frequency of the signal SIGL, to electrically couple each region 510 to the node 200 and to electrically decouple these regions 510 from the node SN.

By way of example, for each channel CHi (CHi, CH2, CH3, and CH4 in FIG. 7), the circuit SEL comprises a first switch coupling the region 510 of the photodiode PDi of this channel to the node 200, this first switch being for example in series with the resistor Ri of this channel CHi between the photodiode PDi of this channel CHi and the node 200, for example connected between this photodiode PDi and this resistor Ri. Further, by way of example, for each channel CHi, the circuit SEL comprises a second switch coupling the region 510 of this channel CHi to the node SN. The first and second switches of the circuit SEL are, for example, controlled so that the first switches are off when the second switches are on, and so that the second switches are off when the first switches are on.

Those skilled in the art will be able to provide other implementations of the circuit SEL, for example using multiplexers.

During a phase of resetting the potential of node 202, prior to a phase of detecting the frequency of the signal SIGL, switch IT1 is turned on by the signal RST, and node 202 is then set to the potential Vrst of node 204. Switch IT1 is then switched off, leaving node 202 floating. During this reset phase, the circuit SEL preferably couples regions 510 to node 200 and decouples regions 510 from node SN.

In a subsequent phase of detecting the frequency of the signal SIGL implemented concurrently with a light integration phase in the pinned photodiode 508 (FIG. 5), the circuit SEL couples regions 510 to node 200 and decouples regions 510 from node SN. The circuit LECT2 then provides the signal OUT2 at the frequency of the signal SIGL.

In a subsequent phase of transferring photogenerated charges from region 508 (FIG. 5) to regions 510, the circuit SEL couples regions 510 to node SN and decouples regions 510 from node 200. The node SN is then initialized to the initialization potential Vinit by the circuit LECTSUP. For example, the node SN is initialized to the potential Vinit by switching the switch INIT on, then the switch INIT is switched off so that the potential Vinit is stored on the node SN. Next, charge transfer to the node SN is implemented. To do this, switch IT1 is switched on, so that the potential Vrst is applied to node 202 (the conductive core of the gate VEGA). The value of the potential Vrst is then chosen so that the gate VEGA is on, this value of the potential Vrst being, for example, different from that of the potential Vrst during the phase of resetting node 202 prior to a frequency detection phase. More particularly, during the transfer phase, the value of the potential Vrst is chosen so that the gate is in the on state, whereas, during the phase of resetting node 202, the value of the potential Vrst is chosen so that the gate VEGA remains blocked throughout the entire frequency detection phase. When the gate VEGA is set at the on state, charges are transferred from region 508 to node SN. The end of charge transfer is caused by setting the gate VEGA at the off state. Turning the gate VEGA to the blocked state to terminate charge transfer is implemented, for example, by switching the potential Vrst to a value that switches the gate VEGA to the blocked state. Then, at the end of the transfer phase, switch IT1 is switched to the blocked state.

So, a transfer phase consecutively comprises resetting node SN, switching gate VEGA at the on state, and then switching gate VEGA at the off state. Preferably, throughout the transfer phase, the circuit SEL maintains regions 510 coupled to the node SN, and regions 510 decoupled from the node 200.

Following the transfer phase, during a phase of reading these transferred charges, the circuit SEL keeps the regions 510 coupled to the node SN and the regions 510 decoupled from the node 200. The circuit LECTSUP then reads the photogenerated charges that have been transferred in the regions 510. For the example circuit LECTSUP shown in FIG. 7, this reading phase comprises switching the switch RD to the on state.

By way of example, during a transfer phase, between initialization of the regions 510 (i.e. the node SN) at the potential Vinit and the transfer of charges to the node SN, a phase for reading the initialization potential of the regions 510 (i.e. the node SN) can be provided, for example so as to implement Correlated Double Sampling (CDS). Reading the node SN, and more particularly the initialization potential of the node SN, is implemented, for example, by switching the switch RD to the on state.

By way of example, between the end of a phase of reading the transferred charge and the start of a simultaneous phase of integrating light and detecting the frequency of the signal SIGL, region 508 is emptied of the photogenerated charges located there. To this end, while the circuit SEL couples the regions 510 to the node SN and decouples the regions 510 from the node 200, the gate VEGA is switched to the on state and the potential Vinit is applied to the regions 510. In the example circuit LECTSUP shown in FIG. 7, this involves setting the potential Vrst to a value suitable to cause the gate VEGA on when the switch INIT is on, and simultaneously switching the switch INIT to the on state, so that the potential Vinit is applied to regions 510, and therefore to region 508, as the gate VEGA is on.

Although an example has been described in relation to FIG. 7 in which the circuit LECT2 is connected to the node 202, in another example not shown, this circuit LECT2 is coupled to the node 202 by a switch, so that, during a phase of transferring charges from the region 508 to the regions 510 and a phase of reading the transferred charges, this switch is turned at the off state to electrically decouple the circuit LECT2 from the node 202.

An advantage of the pixel described in relation to FIGS. 5 to 7 is that, in a pixel array comprising a plurality of such pixels, when a pixel implements a frequency detection function, the resolution of a two-dimensional image captured by the pixel array is not affected since this pixel also implements, simultaneously with frequency detection, an integration of the visible light it receives.

Another advantage of the pixel described in relation to FIGS. 5 to 7 is that the capacitive elements are directly integrated into the pixel, taking advantage of the presence of the transfer gate VEGA used for transferring photogenerated charges during the integration of light corresponding to the acquisition of a two-dimensional image.

Although FIGS. 5 to 7 describe a pixel PIX2 in which the sense circuit LECT2 of the pixel is connected to node 202, those skilled in the art will be able to adapt this description to the case of a pixel PIX2 in which the sense circuit LECT2 of the pixel is coupled, for example selectively, or connected to one of the regions 510 of the photodiodes PDi, and to the case of a pixel PIX3 in which the sense circuit LECT3 of the pixel is connected to node 200.

Compared with circuit LECT2, circuit LECT3 has the advantage that its bias potential Vdd3 (FIG. 3) or Vdd4 (FIG. 4) can be higher than potential Vdd2 when these circuits are implemented with the pixel as described in relation to FIGS. 5, 6, and 7. Indeed, when the circuit LECT2 is connected to node 202 of the pixel as described in relation to FIGS. 5, 6, and 7, i.e. to the conductive core of the gate VEGA, the threshold of the circuit LECT2, for example its comparator COMP, is determined so that the signal OUT3 is at the frequency of the signal SIGL, and, further, the gate VEGA is in the blocked state, in which case this threshold may be zero, or even negative. This is not the case with the circuit LECT3 connected to node 200.

Although not illustrated in any drawing, one embodiment provides a sensor comprising a plurality of pixels PIX2 or PIX3. For example, the sensor comprises an array of pixels. For example, some of the pixels in the array correspond to pixels PIX2 or PIX3, while the other pixels in the array correspond to pixels similar to pixels PIX2 and PIX3. These other pixels preferably have the same configuration of their gates VEGA to have the same pinned photodiode and node SN capacitance characteristics (although this is not essential) as the pixels PIX2 or PIX3. Further these other pixels can be devoid of circuits LECT2 and LECT3. These other pixels preferably comprise the circuit SEL, so as to have the same capacitance characteristics on the nodes SN (although this is not essential). Preferably, all pixels of the array have the same dimensions in top view, which facilitates the implementation of the pixel array, and, further, reduces dispersions between pixels. Such a sensor can then measure a frequency of the signal SIGL, preferably in the infrared range, and, further, acquire a two-dimensional image, for example a color image, by integrating light, for example visible light, into the pinned photodiodes 508 of all pixels of the array. Preferably, when the sensor is configured to acquire a two-dimensional, color image of a scene, the pixels PIX2 and PIX3 are configured to integrate blue light, which penetrates less deeply into the silicon than red light and green light.

In the embodiments and alternatives described above, during a phase of detecting the frequency of signal SIGL, node 202 is left floating after being reset to the potential Vrst, or, in other words, no potential is applied to node 202 during a frequency detection phase.

Various embodiments and variants have been described. Those skilled in the art will understand that certain features of these embodiments can be combined and other variants will readily occur to those skilled in the art.

In particular, have been described above in relation to FIGS. 2 to 7 example embodiments and alternatives in which, in each channel CHi, the capacitive element Cci of that channel CHi couples the cathode Ki of the photodiode PDi of the channel to node 202, corresponding, for example, to examples where the DC potential at node 200 is greater than the potential Vss at node 201. In other examples, where the DC potential on node 200 is lower than the potential Vss, the photodiode PDi of each channel is connected in the opposite way to that described in relation to the figures, its anode then being on the side of the resistor R1 and its cathode on the side of node 201, and the elements Cci then couple the anodes of the photodiodes PDi to node 202. Referring back to the example of FIGS. 5 to 7, this means reversing all conductivity types.

More generally, those skilled in the art will be able to adapt the examples described where the elements Cci couple the cathodes of the photodiodes PDi to node 202 to examples where the elements Cci couple the anodes of the photodiodes PDi to node 202.

Finally, the practical implementation of the embodiments and variants described herein is within the capabilities of those skilled in the art based on the functional description provided hereinabove. In particular, concerning the values of the various DC potentials described above, those skilled in the art will be able, from the description made above, to choose these values to obtain the operation described.

The invention claimed is:

1. A pixel comprising a first node, a second node configured to receive a first DC potential, and a plurality of acquisition channels each comprising:
   - a photodiode adapted to detect radiation in a first wavelength range;
   - a capacitive element coupling the photodiode to the first node; and
   - a resistive element coupling a first terminal of the photodiode to the second node,
     wherein the pixel further comprises:
     a switch coupling the first node to a node configured to receive a second DC potential; and
     a control circuit configured to control the switch to the off state during an acquisition phase so that the first node is floating.

2. The pixel according to claim 1, wherein, in each channel, the capacitive element has one electrode connected to the first node, and another electrode connected to the photodiode.

3. The pixel according to claim 1, wherein, in each channel, the photodiode is a non-pinned photodiode.

4. The pixel according to claim 1, wherein the pixel comprises a sense circuit having an input coupled to the first node.

5. The pixel according to claim 4, wherein the sense circuit is configured to provide a binary signal in a first state if a voltage on the first node is above a threshold, and in a second state if the voltage on the first node is below the threshold.

6. The pixel according to claim 1, wherein the pixel comprises a sense circuit having an input coupled to the first terminal of the photodiode of one of the channels of the pixel.

7. The pixel according to claim 6, wherein the sense circuit is configured to provide a binary signal in a first state if a voltage on the first node is above a threshold, and in a second state if the voltage on the first node is below the threshold.

8. The pixel according to claim 1, wherein the pixel comprises a sense circuit having an input connected to the second node, the sense circuit being configured to supply the first potential to the second node.

9. The pixel according to claim 8, wherein the sense circuit is further configured to convert a current on its input into a voltage and to provide a binary signal in a first state if said voltage is above a threshold, and in a second state if said voltage is below the threshold.

10. The pixel according to claim 1, wherein:

the pixel comprises a first semiconductor region doped with a first type of conductivity, adapted to detect radiation in a second wavelength range and extending from a first face, the first face being intended to receive radiation in the first and second wavelength ranges;

the photodiode of each channel comprises:

a second semiconductor region doped with the first type of conductivity, corresponding to the first terminal of the photodiode and extending from a second face parallel to the first face, and a third semiconductor region doped with the second type of conductivity and sandwiched between the first region and the second region;

the pixel comprises a vertical transfer gate extending from the second face to the first region, the transfer gate electrically isolating the photodiodes of the channels from each other, and being in contact with each second region.

11. The pixel according to claim 10, wherein the vertical transfer gate comprises a conductive core and an insulating sheath, the conductive core corresponding to the first node of the pixel.

12. The pixel according to claim 10, wherein the pixel further comprises:

an additional sense circuit and a circuit configured to:

selectively couple and uncouple the first electrode of the photodiode of each channel from the second node; and selectively couple and uncouple the first electrode of the photodiode of each channel from the additional sense circuit.

13. A sensor comprising a plurality of pixels according to claim 1.

* * * * *